No. 624,369. Patented May 2, 1899.
J. McLERNON.
SPECTACLES.
(Application filed Mar. 4, 1898.)

(No Model.)

WITNESSES:

INVENTOR
J. McLernon
BY
ATTORNEYS.

UNITED STATES PATENT OFFICE.

JOHN McLERNON, OF POTTSVILLE, PENNSYLVANIA.

SPECTACLES.

SPECIFICATION forming part of Letters Patent No. 624,369, dated May 2, 1899.

Application filed March 4, 1898. Serial No. 672,563. (No model.)

*To all whom it may concern:*

Be it known that I, JOHN McLERNON, of Pottsville, in the county of Schuylkill and State of Pennsylvania, have invented new and useful Improvements in Spectacles, of which the following is a full, clear, and exact description.

The object of the invention is to provide new and improved spectacles more especially designed for the use of engravers, jewelers, watchmakers, or other persons to take the place of the loop or eyeglass heretofore used on one eye only, the spectacles enabling the wearer to see minute objects with both eyes, the arrangement being such as to permit of bringing the lenses into proper focus relatively to the eyes of the user and the work at hand.

The invention consists of novel features and parts and combinations of the same, as will be described hereinafter and then pointed out in the claims.

Reference is to be had to the accompanying drawings, forming a part of this specification, in which similar characters of reference indicate corresponding parts in all the figures.

Figure 1:
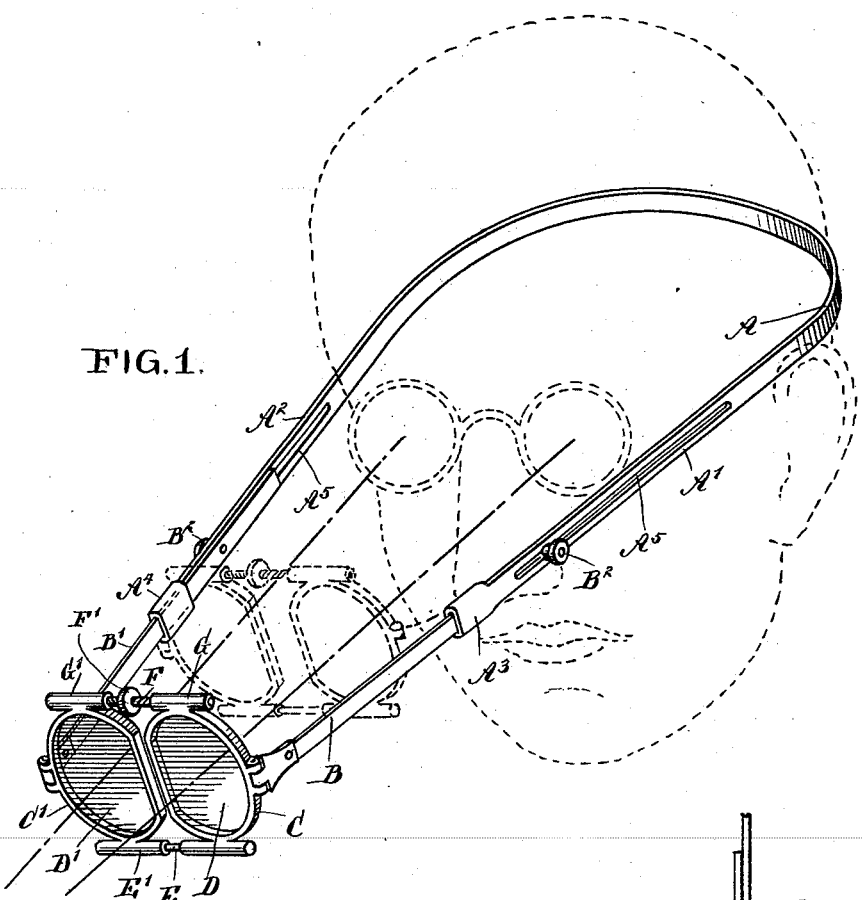
Figure 2:
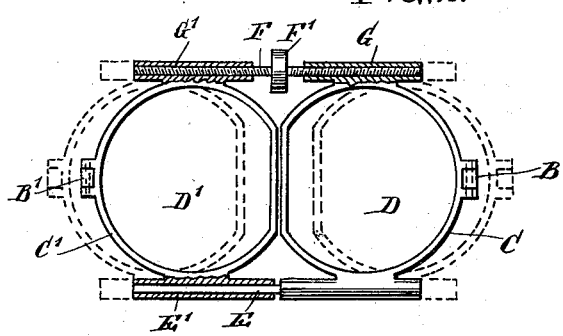
Figure 3:
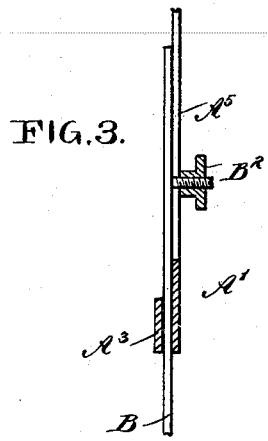

Figure 1 is a perspective view of the improvement. Fig. 2 is an enlarged sectional front elevation of the adjusting device for the lenses, and Fig. 3 is an enlarged sectional plan view of the adjustable temples.

The improved spectacles are provided with a head-band A, made U-shaped and adapted to fit around the head, the sides of the band extending over the ears of the user to properly support the band in position on the head, as indicated in Fig. 1. The side arms A' A² of the band are formed at their forward ends with bearings A³ A⁴, respectively, in which are fitted to slide the temples B B', respectively, each carrying a clamping-screw B², extending through an elongated slot A⁵ in the corresponding arm A' or A² of the band A. By this arrangement the temples B B' can be adjusted endwise on the arms A' A² of the band A and then securely fastened in place thereon by the clamping-screws B².

The temples B B' are pivotally connected with independent spectacle-frames C C', respectively, containing the lenses D D' and arranged to be adjusted toward or from each other to obtain the proper focus. For this purpose the frame C is provided at its lower end with a guide-bar E, fitted to slide in a bearing E' on the frame C', and on the top of the frames C C' is arranged a right and left hand threaded screw-rod F, screwing in corresponding nuts G G' on the said frames C C', respectively. At the middle of the screw-rod F is arranged a knob F' for conveniently turning the screw-rod so as to screw the nuts G G', and consequently the frames C C', toward or from each other, the frames being guided by the bar E in the bearing E'.

Now it is evident that by the construction described the lenses D D' can be brought nearer to or farther from the eyes of the wearer by adjusting the temples B B' in the side arms A' A² of the band A, and the lenses can be moved toward or from each other edgewise to bring the line of vision through the center of the lenses and obtain the proper focus.

The device is very simple and durable in construction, can be cheaply manufactured, and can be readily worn by persons wearing glasses or not, as the device does not interfere with ordinary spectacles if such are used.

It is understood that by the arrangement described both of the user's eyes are simultaneously employed for viewing minute objects through the lenses D D', and consequently the eyes are relieved of strain incident to the use of a loop or single eyeglass as heretofore practiced.

Having thus fully described my invention, I claim as new and desire to secure by Letters Patent—

1. Spectacles, comprising a head-band, temples adjustable on the said band, lenses pivoted to the temples, and means for connecting the lenses with each other on opposite sides, the connecting means on one side being slidable, and that on the other side serving to adjust the lenses toward and from each other as set forth.

2. Spectacles, comprising a head-band provided with bearings, temples fitted to slide in said bearings, means for adjustably securing the temples in the bearings of the head-band, lens-frames pivoted to the temples, and means for connecting the lens-frames with each other on their upper and lower sides, the lower connecting means being slidable, and the upper connecting means serving to adjust the frames toward and from each other, substantially as described.

3. The combination of lens-frames having a sliding connection with each other at one side and each provided with a nut on the opposite side, and a right and left hand screw-rod working in the said nuts, substantially as described.

4. The combination of lens-frames, one provided with a guide-bar and the other with a bearing to receive the guide-bar and each provided with a screw-nut on the side opposite the guide-bar and bearing, and a right and left hand screw-rod working in the screw-nuts, substantially as described.

5. Spectacles, comprising a head-band, temples adjustably secured to the head-band, lens-frames pivoted to the temples and having a sliding connection with each other on the under side, each frame being provided with a nut on its upper side, and a right and left hand screw-rod working in the nuts, substantially as described.

6. Spectacles, comprising a head-band, temples adjustably secured to the head-band, lens-frames pivoted to the temples, a nut on the upper side of each frame, a guide-rod on the lower side of one frame, a bearing on the lower side of the other frame and receiving the said guide-rod, and a right and left hand screw-rod working in the nuts and provided with a knob at its middle, substantially as described.

JOHN McLERNON.

Witnesses:
W. L. KRAMER,
R. S. BASHORE.